(12) United States Patent
Newman

(10) Patent No.: US 11,238,115 B1
(45) Date of Patent: Feb. 1, 2022

(54) SEMANTIC AND CONTEXT SEARCH USING KNOWLEDGE GRAPHS

(71) Applicant: Wells Fargo Bank, N.A., San Francisco, CA (US)

(72) Inventor: David Newman, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 274 days.

(21) Appl. No.: 15/645,582

(22) Filed: Jul. 10, 2017

Related U.S. Application Data

(60) Provisional application No. 62/360,890, filed on Jul. 11, 2016.

(51) Int. Cl.
| | |
|---|---|
| *G06F 16/9535* | (2019.01) |
| *G06Q 30/06* | (2012.01) |
| *G06F 16/335* | (2019.01) |
| *G06F 16/33* | (2019.01) |
| *G06F 16/901* | (2019.01) |
| *G06Q 50/16* | (2012.01) |

(52) U.S. Cl.
CPC ........ *G06F 16/9535* (2019.01); *G06F 16/337* (2019.01); *G06F 16/3344* (2019.01); *G06F 16/9024* (2019.01); *G06Q 30/0627* (2013.01); *G06Q 50/16* (2013.01)

(58) Field of Classification Search
CPC ............ G06F 16/9535; G06F 16/3344; G06F 16/9024; G06F 16/337; G06F 16/245; G06F 40/30; G06Q 50/16; G06Q 30/0627
See application file for complete search history.

(56) References Cited

U.S. PATENT DOCUMENTS

| | | | | |
|---|---|---|---|---|
| 8,793,198 B1* | 7/2014 | Thomas | ................ | G06N 20/00 |
| | | | | 706/12 |
| 9,196,007 B1* | 11/2015 | Thomas | ................ | G06Q 50/16 |
| 2002/0022956 A1* | 2/2002 | Ukrainczyk | .......... | G06F 16/353 |
| | | | | 704/9 |
| 2003/0078825 A1* | 4/2003 | Cope | ..................... | G06Q 40/04 |
| | | | | 705/26.8 |
| 2004/0095380 A1* | 5/2004 | Bass | .................. | G06F 3/04842 |
| | | | | 715/738 |

(Continued)

OTHER PUBLICATIONS

"U.S. Appl. No. 15/645,574, Non Final Office Action dated Apr. 5, 2019", 11 pgs.

(Continued)

*Primary Examiner* — Albert M Phillips, III
*Assistant Examiner* — Fatima P Mina
(74) *Attorney, Agent, or Firm* — Schwegman Lundberg & Woessner, P.A.

(57) ABSTRACT

A method may include receiving a search query, from a requesting computing device, including a set of text elements; matching a first portion of the set of text elements in the search query to a set of objects in a semantic ontology; determining a requested output type for the search query based in part on the matching; querying a data store formatted in accordance with the semantic ontology for a set of data corresponding to the requested output type; and transmitting the set of data corresponding to the requested output type to the requesting computing device.

14 Claims, 7 Drawing Sheets

(56) References Cited

U.S. PATENT DOCUMENTS

| | | | |
|---|---|---|---|
| 2006/0206883 A1* | 9/2006 | Sabbouh | G06F 16/972 |
| | | | 717/146 |
| 2007/0079236 A1* | 4/2007 | Schrier | G06F 17/217 |
| | | | 715/206 |
| 2007/0260591 A1* | 11/2007 | Ahi | G06Q 10/109 |
| 2008/0270458 A1* | 10/2008 | Gvelesiani | G06F 16/287 |
| 2010/0185637 A1 | 7/2010 | Morris et al. | |
| 2012/0023055 A1 | 1/2012 | Dagaeff | |
| 2012/0131189 A1* | 5/2012 | Smart | G06F 21/64 |
| | | | 709/225 |
| 2012/0303611 A1 | 11/2012 | Kusumura et al. | |
| 2012/0323741 A1 | 12/2012 | Rangachari et al. | |
| 2013/0054621 A1* | 2/2013 | Kretz | G06N 5/022 |
| | | | 707/749 |
| 2013/0080461 A1* | 3/2013 | Byrne | G06F 16/9024 |
| | | | 707/769 |
| 2013/0262501 A1* | 10/2013 | Kuchmann-Beauger | G06F 16/9024 |
| | | | 707/769 |
| 2013/0290226 A1* | 10/2013 | Dokken | G06Q 10/0637 |
| | | | 706/12 |
| 2014/0018034 A1* | 1/2014 | Lindberg | H04W 4/38 |
| | | | 455/405 |
| 2014/0025643 A1 | 1/2014 | Baldwin et al. | |
| 2014/0040275 A1* | 2/2014 | Dang | G06F 16/2228 |
| | | | 707/741 |
| 2014/0236579 A1* | 8/2014 | Kurz | G06F 17/28 |
| | | | 704/9 |
| 2015/0012561 A1 | 1/2015 | Kirchoff | |
| 2015/0127632 A1* | 5/2015 | Khaitan | G06F 16/9535 |
| | | | 707/722 |
| 2015/0178853 A1* | 6/2015 | Byron | G06Q 40/12 |
| | | | 705/30 |
| 2015/0332670 A1* | 11/2015 | Akbacak | G10L 15/063 |
| | | | 704/9 |
| 2015/0347533 A1* | 12/2015 | Shakirzianov | G06F 8/20 |
| | | | 717/104 |
| 2016/0110389 A1* | 4/2016 | Oltman | G06F 16/2291 |
| | | | 707/736 |
| 2017/0024657 A1* | 1/2017 | Sahu | G06N 7/02 |
| 2017/0061001 A1* | 3/2017 | Tonkin | G06N 5/04 |
| 2017/0083547 A1 | 3/2017 | Tonkin et al. | |
| 2017/0177642 A1 | 6/2017 | Burger et al. | |

OTHER PUBLICATIONS

"U.S. Appl. No. 15/645,574, Response filed Jul. 3, 2019 to Non Final Office Action dated Apr. 5, 2019", 10 pgs.

"U.S. Appl. No. 15/645,574, Final Office Action dated Oct. 29, 2019", 10 pgs.

"U.S. Appl. No. 15/645,574, Response filed Dec. 30, 2019 to Final Office Action dated Oct. 29, 2019", 10 pgs.

"U.S. Appl. No. 15/645,574, Advisory Action dated Feb. 3, 2020", 3 pgs.

"U.S. Appl. No. 15/645,574, Response filed Apr. 3, 2020 to Advisory Action dated Feb. 3, 2020".

"U.S. Appl. No. 15/645,574, Non Final Office Action dated May 5, 2021".

Das, Souripriya, et al., "R2RML: RDB to RDF Mapping Language", (Sep. 17, 2012), 39 pgs.

* cited by examiner

SEMANTIC AND CONTEXT SEARCH USING KNOWLEDGE GRAPHS

CROSS-REFERENCE TO RELATED APPLICATION

This patent application claims the benefit of U.S. Provisional Patent Application No. 62/360,890, filed Jul. 11, 2016, entitled "SEMANTIC AND CONTEXT SEARCH USING KNOWLEDGE GRAPHS", which is incorporated by reference herein in its entirety.

TECHNICAL FIELD

Embodiments described herein generally relate to electronic search and in particular, but without limitation, to semantic and context search using knowledge graphs.

BACKGROUND

A user may submit a search query to a search engine to retrieve a list of pages that are relevant to the query. For example, a query may be "Best Italian restaurants." The search engine may have previously indexed a number of webpages. The search engine may examine the indexes and match webpages that appear to contain an answer to the user's query and present the matched webpages.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 is a flowchart illustrating a method to process a semantic search query, according to various examples; and in which

DETAILED DESCRIPTION

Figure 1:
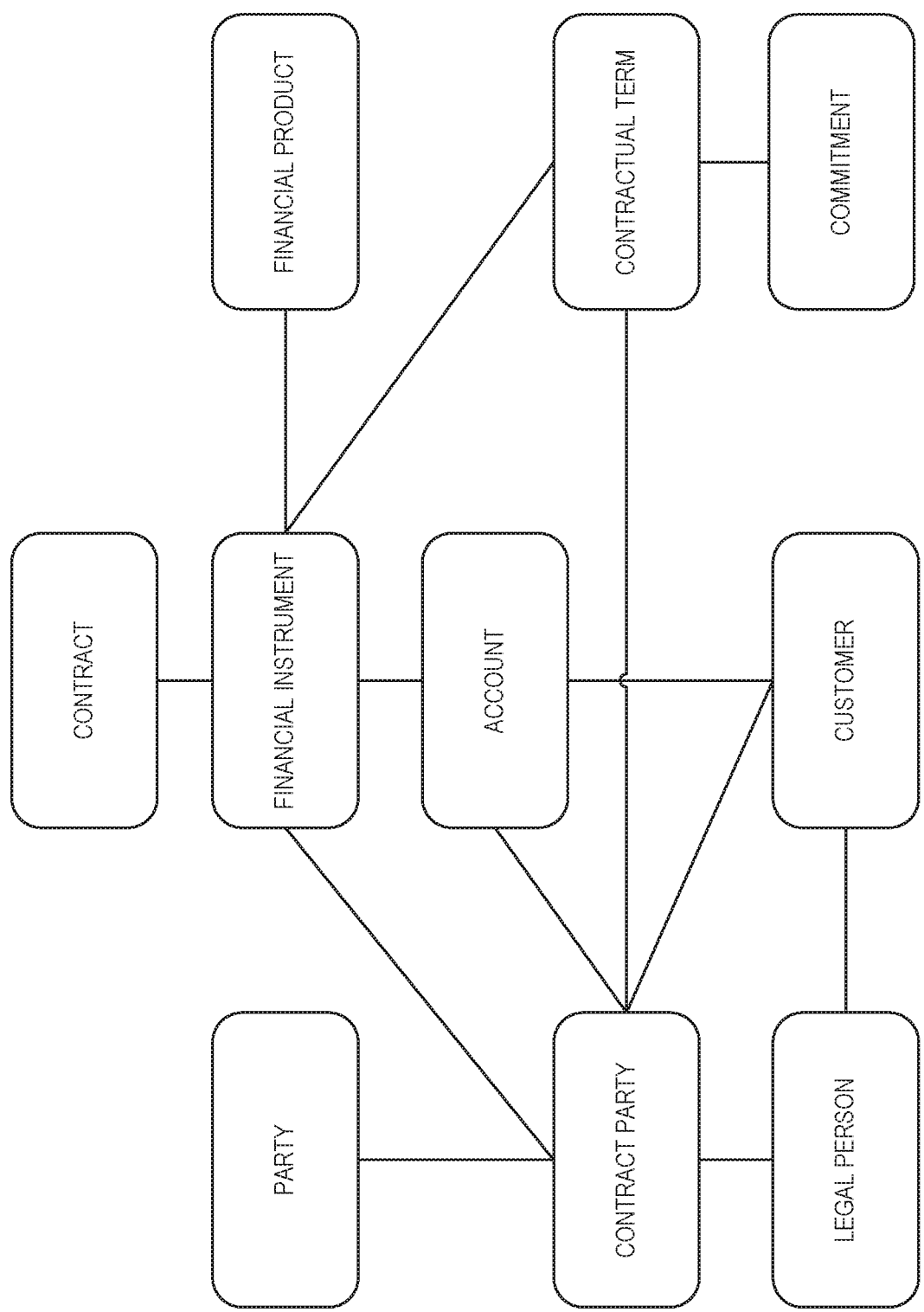
FIG. 1 is a diagram depicting relationships between objects that may be in a contract, according to various examples.

Searching on the internet presents a number of technical challenges. For example, consider a statement "Show me homes around me that are for sale." If such a statement were entered into a traditional search engine, the results would likely not be a list of homes that are currently around you. Instead, the results would more likely be a set of webpages that may themselves be searched for homes. One reason for the failure of the search engine to provide you with an actual listing of homes is that many websites are not structured according to a common format that permits easy and accurate retrieval of sets of data (e.g., home prices, location data, etc.). Instead, each website may encode the data differently. Thus, a developer of a home search engine may need to hardcode these encodings when indexing the various home listing websites. Even then, the search engine may be limited to home searches unless similar coding techniques were conducted for all other possible searches (e.g., cars, jobs, loans, etc.).

In an attempt to address some of these deficiencies, a number of standards have been proposed and/or adopted to promote structured, indexable, and searchable data on the internet—among other data repositories. For example, schema.org maintains semantic ontologies for describing "types" with properties (discussed in more detail below) that may be encoded in markup language documents, such as webpages. The technologies and standards that generally govern the semantic web are often referred to as the "semantic web stack."

An ontology may be a taxonomy of objects for a given field-different fields may use different ontologies. The ontology may identify types (e.g., objects), properties, and inter-relationships between the objects. When used in the electronic realm, an ontology may be used to determine if data complies with the ontology. In some examples, the definition of an ontology is described and stored as a schema at a network-accessible uniform resource identifier (URI).

As a simple example, consider a schema for a Person object. The schema may include a number of entries that define the properties of a Person object such as "given name," "height," "weight," etc., and the properties may also have expected types. Thus, the "height" property may have a quantitative type whereas "given name" may be text. The expected type of an object may be another object such as a property of "knows" having an expected type of Person. Accordingly, the data string "Alice knows Bob" can be thought of as two Person objects with the Alice object having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to our example Person schema, the predicate is the property in the schema and the expected type is the object. In other words, a schema may semantically define valid relationships between multiple objects.

As another example, consider FIG. 1 depicting relationships between objects that may be in a contract. Industry groups may promulgate schemas/ontologies for use by their members or for communicating with their members. For example, the Financial Industry Business Ontology (FIBO™) identifies numerous objects and their semantically defined relationships common in the financial industry—such as depicted in FIG. 1.

Figure 2:
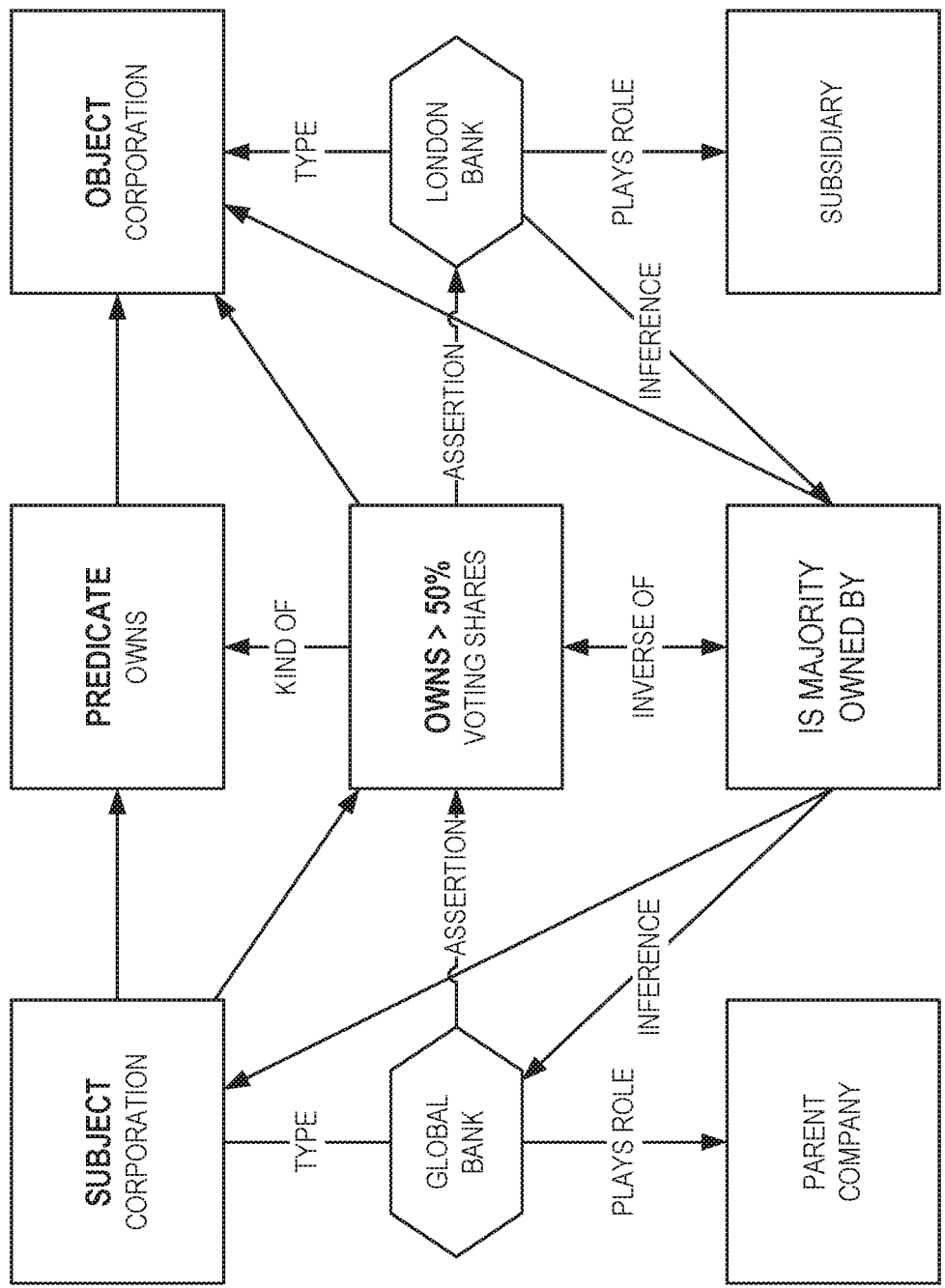
FIG. 2 is a semantic representation of a sentence, according to various examples.

FIG. 2 illustrates the concept of "Corporate Ownership" as used in a semantic ontology, according to an example. The example uses the S-P-O format discussed above. One flexibility of a semantic ontology is that data from any number of sources may be standardized and harmonized. Accordingly, once a data store (e.g., file system, relational database, NoSQL database, flat file database) is populated with enough semantically intact data, the data may be mined, stored, queried, audited, and validated. The data may originate in a number of forms such as unstructured data, a spreadsheet, a relational database, Extensible Markup Language (XML), JavaScript Object Notation, etc.

In some examples, a specific database, known as a triplestore (also sometimes referred to as a resource description framework (RDF)), is used to store semantic data. Each entry in a triplestore, a triple, stores data according to the S-P-O format. For example, "Jill knows Jane" or "Bob is a painter."

In some instances, a service (e.g., a web service) may map or translate unstructured data into the S-P-O format. For example, a webpage may include the unstructured data "Global Bank owns>50% voting shares of London Bank." This data may be parsed into the S-P-O format of subject: Global Bank; predicate: owns; and object: London Bank. At this point, the service may update a triplestore to indicate the relationship between Global Bank and London Bank according to a defined schema.

Furthermore, a webpage may be encoded according to one or more semantic ontologies—potentially eliminating the need for natural language processing of unstructured data. Encoding techniques include, but are not limited to, RDFa, Microdata, and JavaScript Object Notation for Linked Data (JSON-LD). The encodings may identify a URI where the definition of the type of object may be found. For example, in Microdata, the scope of a <div> tag may be identified as <div itemscope itemtype="[example domain]/person">. Accordingly, any subsequent properties set according to "itemprop" may be defined by the schema located at the URI [example domain]/person. RDFa and JSON-LD similarly include declarations of URIs in order to understand and validate the context of semantic objects on a webpage (or e-mail, etc.).

However, even if a webpage is encoded according to a semantic ontology and a search engine is configured to index/search the webpage, a technical challenge remains in that the context of the searcher is not available to the search engine. Thus, a question such as "Show me homes around me that are for sale" would still not result in a listing of homes for sale near the searcher. Various examples below describe a system that provides semantically relevant results taking into consideration the context and knowledge graph of the searcher.

Figure 3:
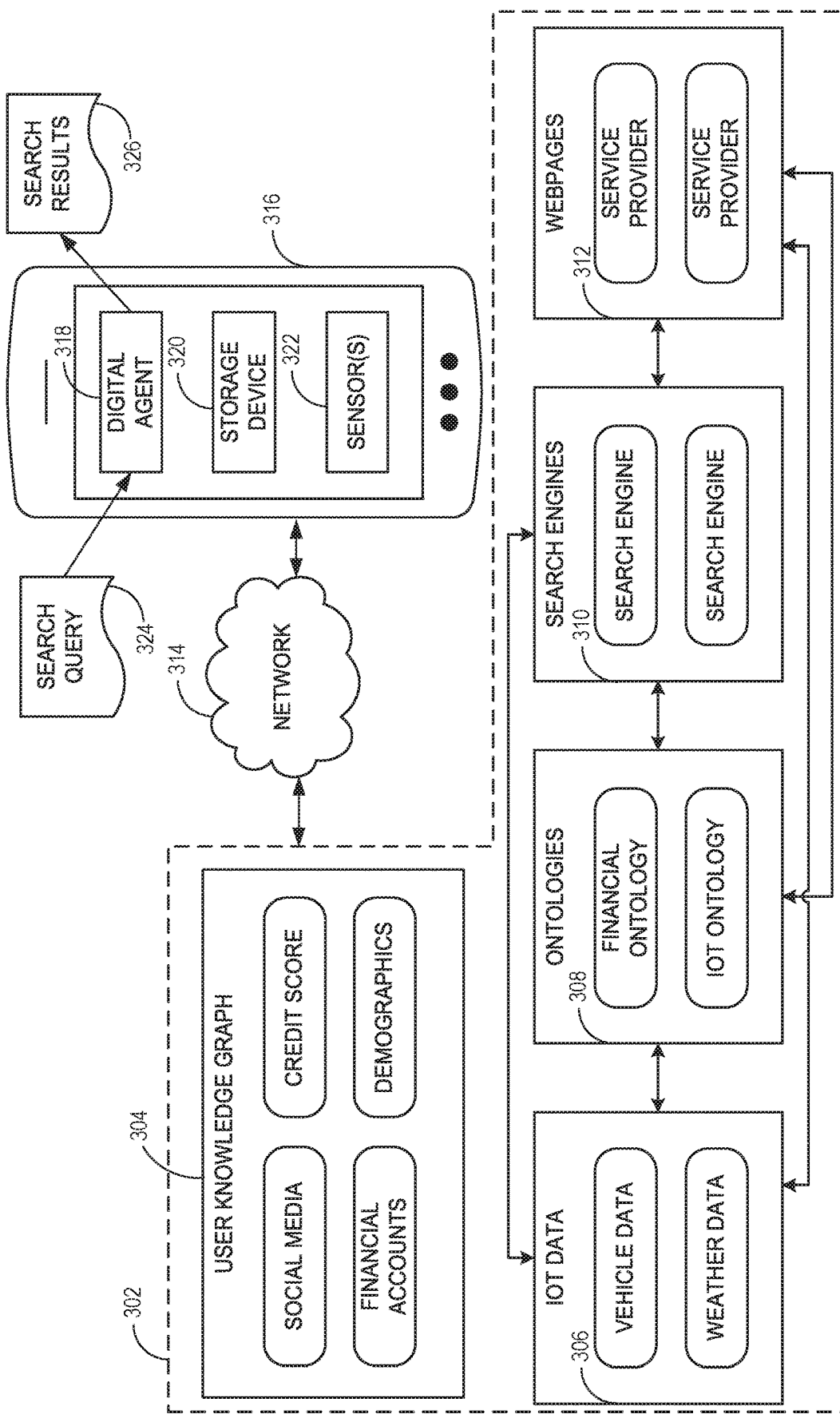
FIG. 3 illustrates a schematic diagram of executing a search query, according to various examples.

FIG. 3 illustrates a schematic diagram of executing a search query, according to various examples. FIG. 3 includes information sources 302, which in turn include user knowledge graph 304, Internet of Things (IoT) Data 306, ontologies 308, search engines 310, and webpages 312. Further illustrated is network 314 connected with computing device 316. Computing device 316 includes digital agent 318, storage device 320, and sensors 322. A search query 324 may be processed by computing device 316 to generate search results 326. For convenience, the above are collectively referred to as components.

In various examples, user knowledge graph 304 includes data associated with a user or group of users. A user may be a person using digital agent 318 to search for information (e.g., search query 324). User knowledge graph 304 may include information gathered from social media accounts (e.g., interests, events, graph of friends, etc.), a credit score of the user, financial account information (e.g., balances), and demographic data (e.g., age, sex, birthdate, occupation) of the user.

The data may be defined according to one or more ontologies. Thus, financial account information may use the vocabulary according to FIBO, in an example. The data may be stored in a triplestore or other data store. In some instances, the data may be stored in a relational database. A map may be used to translate between the relational database and an ontology (e.g., R2RML).

External data sources may be accessed to generate data in the user knowledge graph 304. External data sources may include websites or web services (e.g., webpage 312) that have information associated with the user. In some examples, user knowledge graph 304 stores credentials or access tokens to access the websites or web services. An application programming interface (API) may be provided by the websites or web services to retrieve the information. For example, an API call to a financial web service may include an access token and a request for current account balances of the user. The response may include data encoded according to a semantic ontology (e.g., JSON-LD).

The digital agent 318 may store a complete or partial copy of user knowledge graph 304 on storage device 320 of computing device 316. Digital agent 318 may periodically refresh the copy of user knowledge graph 304. For example, a user may enter in their credentials for the various data sources described above using a user interface presented by digital agent 318. The credentials may be stored and utilized when making API calls—or other data gathering techniques such as screen scraping—to update the data in the user knowledge graph 304.

The IoT Data 306 in FIG. 3 represents the various devices that may transmit information to give context for the search query 324. For example, vehicle data may be from sensors on a car of the user and may indicate where the user is, what type of car the user is driving, how many occupants are in the car (e.g., using weights sensors), etc. Weather data may include data from one or more weather station sensors and indicate the current conditions as well as forecasted conditions. Other IoT sources may indicate road conditions.

The digital agent 318 may access IoT Data 306 in a variety of manners. In some instances, a website (e.g., webpages 312) or web service may collect data from IoT devices and make it available via API calls. Thus, the digital agent 318 may communicate over network 314 to these services and request any needed data. In some examples, digital agent 318 has a list of IoT devices associated with the user (e.g., identifiers). The identifier may be transmitted with the API call to request data from a specific device. As an example, a car manufacturer may provide a web service to request sensor data from a specific vehicle if an identifier and proper credentials are submitted. In some examples, data from IoT devices uses the vocabulary of an ontology—different classes of devices may use different ontologies.

In various examples, search engines 310 may be used to search for semantically tagged data in webpages 312. A search engine may index the tagged data for quick data retrieval similar to how traditional search engines index pages for relevance. As an example, a user may search for a person object type with the name of "John Doe."

A traditional search engine may look for the text "John Doe" across millions of indexed web pages, but be unaware what a match to "John Doe" meant, and thus may simply present a list of pages sorted by the number of times "John Doe" was present on a page. A more sophisticated search engine may look at how many webpages link to a specific webpage as an indication of strength or importance.

Figure 4:
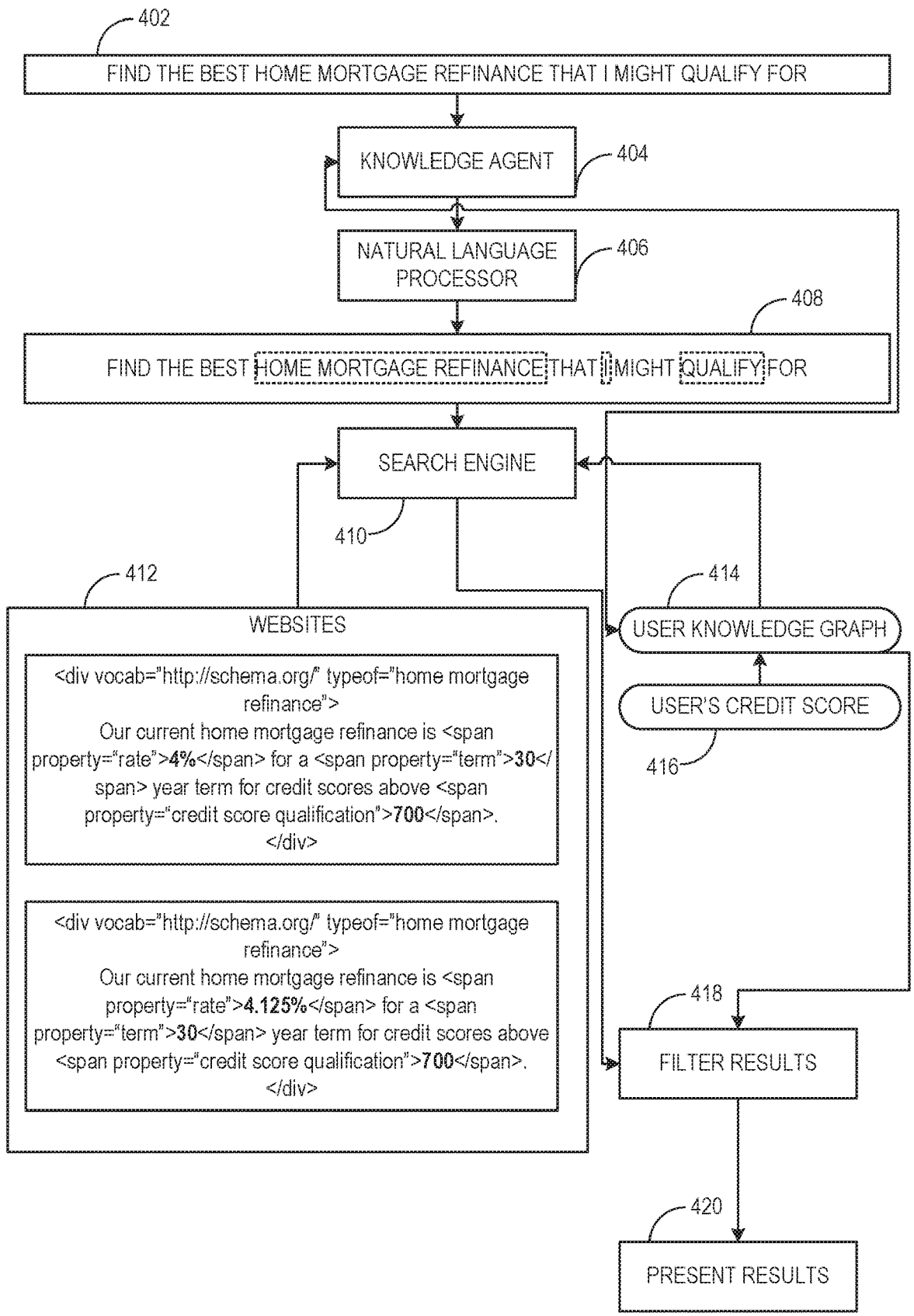
FIG. 4 is a schematic diagram illustrating processing a search query, according to various examples.
Figure 5:
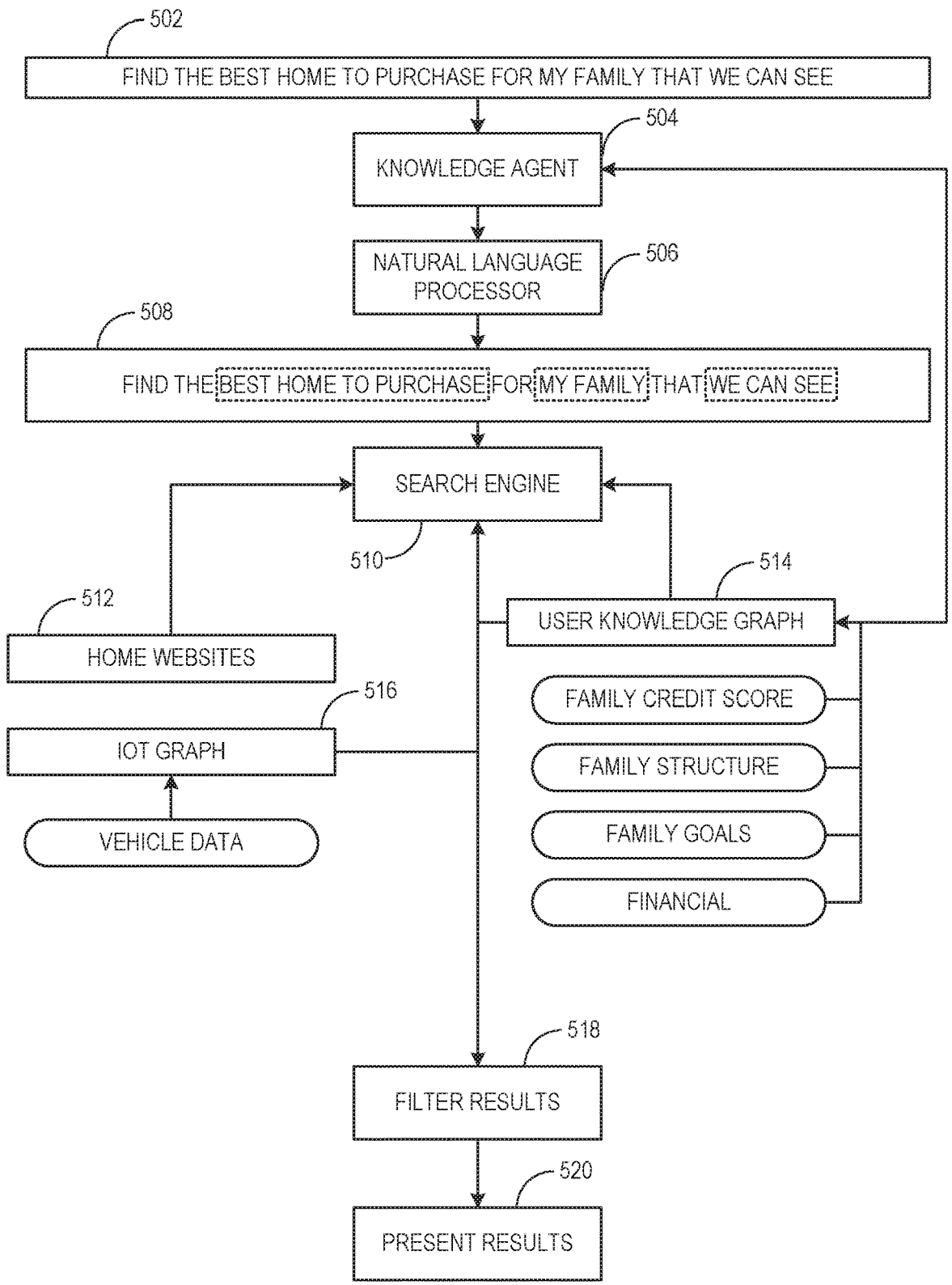
FIG. 5 is a schematic diagram illustrating processing a search query, according to various examples.

In contrast, if a semantic search engine is used, a user may be assured that any result does not just include the text "John Doe," but that the result is a person according to a specific ontology. FIGS. 4 and 5 give more detailed examples of how such a semantic search may occur.

The components of FIG. 3 may be embodied across multiple, geographically diverse computing systems or be co-located in a single location. For example, part of the data of user knowledge graph 304 may be stored in storage device 320. The components may be supported by one or more web servers and databases to facilitate the retrieval and storage of data. The web servers and other components may communicate over one or more networks, such as network 314.

The network 314 may include local-area networks (LANS), wide-area networks (WANs), wireless networks (e.g., 802.11 or cellular networks), the Public Switched Telephone Network (PSTN), ad hoc networks, cellular networks, personal area networks (PANs) or peer-to-peer (e.g., Bluetooth®, Wi-Fi Direct) networks, or other combinations or permutations of network protocols and network types. The network 314 may include a single LAN or wide-area network WAN, or combinations of LANs or WANs, such as the Internet.

FIG. 4 is a schematic diagram illustrating processing a search query, according to various examples. Although knowledge agent 404 is illustrated as separate from natural language processor 406 and search engine 410, the functionality of these three components may exist in a single location. In other words, search engine 410 may act as the knowledge agent 404 and natural language processor 406 in various examples. In various examples, natural language processor 406 exists as an external or separate process from knowledge agent 404.

A user may access knowledge agent 404 by opening a webpage on his/her computing device or as an application residing on the user's computing device. Knowledge agent 404 may execute computer-readable instructions which configure one or more processors of the computing device to perform the functionality described herein.

In some examples, the user logs into knowledge agent 404 to enable knowledge agent 404 to derive the context of the search query. The log in process may also enable knowledge agent 404 to access information such as user knowledge graph 414. As discussed above, information pertaining to a user may be stored in a storage device that is on the same computing device as a knowledge agent.

The process in FIG. 4 may begin with search query 402 being submitted to knowledge agent 404 via a computing device. A user may input search query 402 into knowledge agent 404 using a user interface (UI) input box element (or other UI element) or using a voice command. Next, knowledge agent 404 may submit search query 402 to natural language processor 406 to break the search query 402 into different grammatical text elements (e.g., parts-of-speech tagging) and/or classify the text elements. Various known natural language processing techniques may be used without departing from the scope of this disclosure such as named entity recognition, n-gram analysis, k-means clustering, hidden Markov models, Viterbi algorithm, Brill Tagger, Constraint Grammar, and the Baum-Welch algorithm, etc.

In some examples, a user may select an ontology for the search to help facilitate more accurate results. For example, the when submitting search query 402, a user may indicate that a finance ontology should be used. In other examples, knowledge agent 404 may determine an appropriate ontology (or more than one) based on a confidence level. Natural language processor 406 may determine the subject of search query 402, and knowledge agent 404 may match it to a type in an ontology. To increase the confidence of a correct match, knowledge agent 404 may look for other tagged parts-of-speech in the ontology. The ontology may be stored on the same computing device as knowledge agent 404 or exist in a repository external to the computing device.

Parsed search query 408 (resulting from natural language processor 406) is illustrated with three parts highlighted: home mortgage refinance; I; and qualify. The natural language processor 406 may have indicated (e.g., tagged) that "home mortgage refinance" is the subject and that "I" and "qualify" modify the subject. In other words, "I" and "qualify" provide the context of the search and a list of available "home mortgage refinance" options is the requested output.

Once the above information is known, knowledge agent 404 may proceed in a variety of manners. The knowledge agent 404 may issue (e.g., formulate a URL such as [example domain]?home+mortgage+refinance) a query to search engine 410 to find all home mortgage refinances. The issuing command may also indicate an ontology to use in order to find the relevant information. Thus, according to one ontology, a home mortgage refinance type has properties of a rate, a credit score qualification, and a term. FIG. 4 illustrates websites 412 that have home mortgage refinance tagged objects. Accordingly, search engine 410 may transmit the tagged data back to knowledge agent 404 (e.g., in JSON-LD or other semantic encoding).

At filter results 418, the context of parsed search query 408 may be used to filter the set of results returned by search engine 410. In this example, the context is that the user needs to be able to qualify for the refinance. As discussed above, a home mortgage refinance type may have a property of a "credit score qualification." Accordingly, to properly filter the results, knowledge agent 404 may use the credit score 416 in the user's knowledge graph 414. If search query 402 instead stated, " . . . that my mom might qualify for" knowledge agent 404 may first examine demographic data in the user's knowledge graph 414 and request the user's mom's knowledge graph. For example, both the user and the user's mom may have accounts with knowledge agent 404, and knowledge agent 404 may transmit an authorization request to the mom to access her credit score on behalf of the user.

Continuing the hypothetical above, consider that the user has a credit score of 750—qualifying the user for either refinance illustrated in FIG. 4. Thus, no results are filtered out. The results may then be presented to the user at present results 420. The results may be formatted to illustrate the data retrieved by search engine 410. Consequently, the user may be presented with a list of refinance options with the term and rate of refinance.

In some examples, a user interface element is presented next to each result, which when activated (e.g., clicked), takes the user to apply for the refinance. In some examples, information from the user knowledge graph 414 (e.g., current mortgage information, financial assets, etc.) is automatically entered into the refinance application. This may be enabled by the refinance application being encoded with the same financial ontology as used in the user knowledge graph 414. Thus, knowledge agent 404 may encode the graph information into an API request to the website hosting the refinance application.

In an example, the information from the user knowledge graph 414 is provided to search engine 410 before the search is conducted. Hence, search engine 410 may ignore refinance applications that require credit scores above 750.

FIG. 5 is a schematic diagram illustrating processing a search query, according to various examples. Processing of search query 502, after receipt by knowledge agent 504, by natural language processor 506 to determine parsed search query 508 may operate in a similar fashion as discussed with respect to FIG. 4.

In the FIG. 5 example, the subject (e.g., expected output) of the parsed search query 508 may be a home and specifically a home to purchase (the best one). The context of parsed search query 508 indicates multiple data sources may be required to properly obtain results. One context is that the search is for the user's family and the second context is a filter related to a geographic region.

To determine what the user's family can see, IoT graph 516 may be used to retrieve vehicle data of the user. The vehicle data may indicate a GPS location. Knowledge agent 504 may cross-reference the GPS vehicle data with a GPS sensor of the user's computing device to ensure that the vehicle is currently being driven by the user. A search radius (e.g., 0.25 miles) may be set by knowledge agent 504 around the GPS coordinates. The se of vehicle GPS is just an example, and other techniques to determine the location of a user may be used without departing from the scope of this disclosure.

The user knowledge graph 514 may be used to obtain details on what this family in particular is looking for in a home. The user knowledge graph 514 may include the family credit score (e.g., an average of the spouses), the family structure (e.g., how many kids), the family goals (e.g., save for a vacation), and financial information. This information may be obtained from a variety of sources as discussed in connection with FIG. 3.

The search engine 510 may use the information in IoT graph 516 and user knowledge graph 514 to search for "home" object types in home websites 512 and filter results 518 in order to obtain relevant results for the user. As with FIG. 4, an ontology may be used in order to ensure semantically relevant results are being retrieved. The filtered results may then be presented (520).

Figure 6:
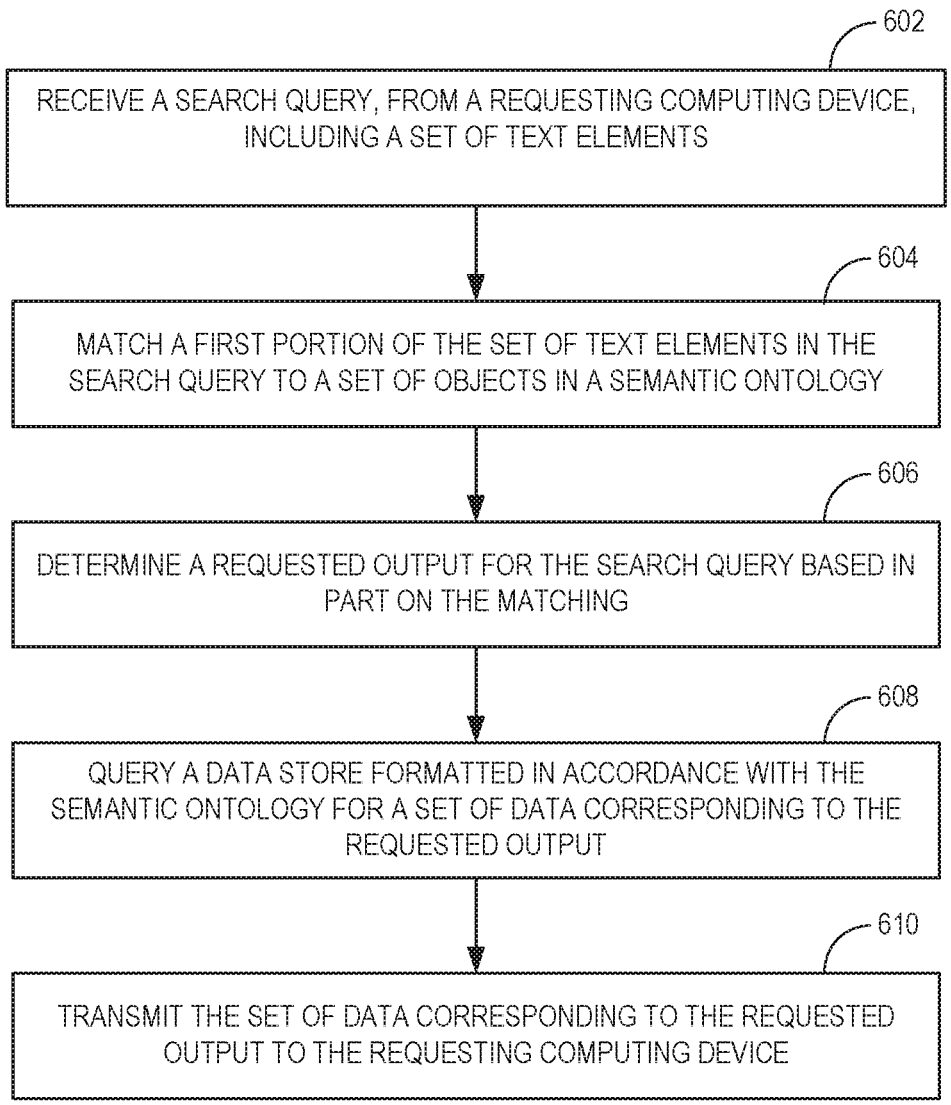

FIG. 6 is a flowchart illustrating a method to process a semantic search query. The method may be embodied in a set of instructions stored in a non-transitory storage device of a computing device. The computing device may have one or more processors that execute the set of instructions to configure the one or more processors to perform the operations illustrated in FIG. 6. To this end, the one or more processors may instruct other parts of the computing device to carry out the set of instructions. For example, the computing device may instruct a network device to transmit data to another computing device or the computing device may provide data over a display interface to present a user interface.

At operation 602, in an example, a search request may be received from a requesting computing device. The request may include a set of text elements. A text element may include one or more words. A dictionary or ontology may be consulted to determine how to split up the words based on various natural language processing algorithms (e.g., n-gram analysis).

At operation 604, in an example, a first portion of the set of text elements is matched to a set of objects in a semantic ontology. The matching may be performed by comparing various portions of the text elements to an ontology. The syntax of the ontology may be formatted according to the Web Ontology Language (OWL), which in turn may be based on the Resource Description Framework. Other syntax may be used without departing from the scope of this disclosure. The semantic ontology may be stored on the same device that received the search query or in an external location.

Matching the first portion of set of text elements in the search query to the set of objects in the semantic ontology may include querying (or parsing) the semantic ontology for an object in the semantic ontology corresponding to a text element of the set of text elements.

At operation 606, in an example, a requested output for the search query may be determined based in part on the matching. A natural language processor (NLP) may be used to determine parts-of-speech of the query and tag the various items with the parts-of-speech. Tagging may output a data structure that lists the text element and a determined part of speech (e.g., [The ball (subject) . . . ]). The requested output may correspond to the tagged subject of the query, in an example.

The method may further include matching a second portion of the set of text elements to contextual information associated with the requested output type. The contextual information may be based on other tagged parts-of-speech that modify the subject. The contextual information may indicate a geographic restriction for the requested output type ("homes around me") or a relationship restriction (e.g., "My family"). In some examples, the first and second portions of the set of text elements may include at least one overlapping text element.

At operation 608, in an example, a data store formatted in accordance with the semantic ontology is queried for a set of data corresponding to the requested output type. In an example, the data store is populated with semantic objects based on parsing a plurality of uniform resource identifiers, the plurality of uniform resource identifiers including tagged markup language elements according to the semantic ontology. For example, the data store may be populated by indexing websites that are semantically tagged. The tags may include a URI to an RDF schema corresponding to an ontology. The data store may be populated in response to receiving the query in some examples or the data store may be populated periodically according to a predetermined schedule.

The data store may be queried for a plurality of semantic objects that match the requested output type. The returned semantic objects may be filtered based on the contextual information. For example, the objects may be returned with the properties of the semantic object. The property values may be compared with the contextual information (e.g., value of a home for sale compared with the query stating "homes less than 300 k").

At operation 610, in an example, the set of data corresponding to the requested output type is transmitted to the requesting computing device. The set of data may correspond to the filtered results in an example. In an example, transmitting may include transmitting a uniform resource identifier, to the requesting computing device, for at least one semantic object remaining of the plurality of semantic objects after the filtering. The URI may take the user to a webpage to see more details about the result. A list of URIs may be transmitted to the requesting computing device corresponding to where the semantic objects were located.

In various examples, a computing device that receives the query gathers data from knowledge graphs corresponding to the requester. For example, if the contextual information indicates a relationship, the receiving computing device may access a storage device to retrieve demographic data for the user. Accessing may include transmitting an API call to a web service or querying a database in various examples. Credentials to access the knowledge graph may be transmitted if necessary.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
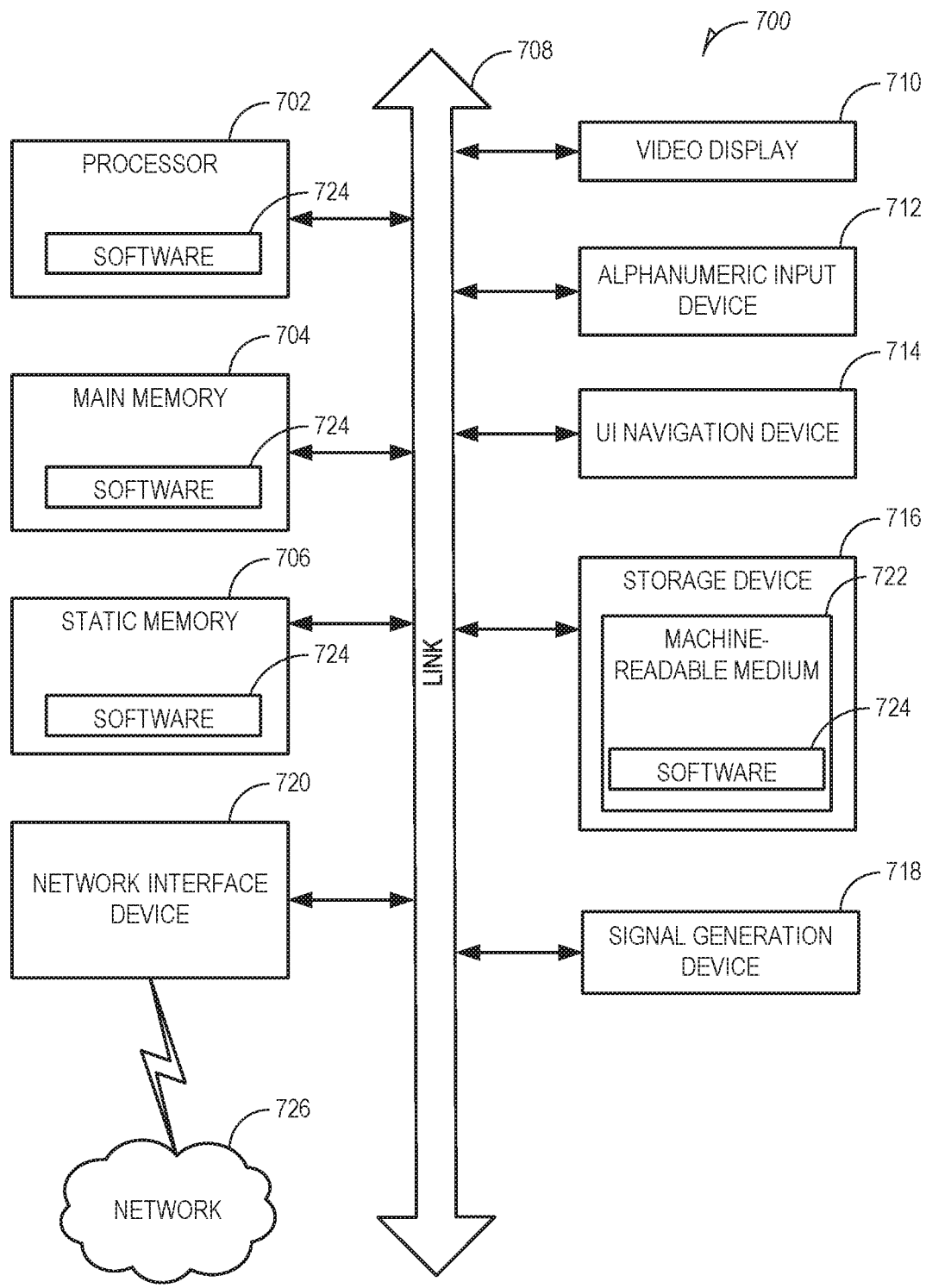
FIG. 7 is a block diagram illustrating an example machine upon which any one or more of the techniques (e.g., methodologies) discussed herein may be performed, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    receiving, from a requesting computing device, a search query associated with a user, the search query including a set of text elements;
    using natural language processing to parse the search query to identify first and second portions of the set of text elements;
    using the identified first portion of the set of text elements of the search query to select a semantic ontology for the search query from among a plurality of semantic ontologies by matching the identified first portion of the set of text elements of the search query to a set of semantic objects in the selected semantic ontology, each semantic ontology in the plurality of semantic ontologies defining types of, properties of, and inter-relationships between semantic objects in the respective semantic ontology;
    determining a requested output type of semantic object being requested by the search query based at least in part on the matching of the identified first portion of the set of text elements of the search query to the set of semantic objects in the selected semantic ontology;
    using the determined requested output type of semantic object to identify, in a data store, a plurality of semantic objects of the requested output type,
        the data store being formatted in accordance with the selected semantic ontology,
        the data store having been populated with semantic objects of the requested output type,
        the semantic objects of the requested output type having been identified by a semantic search engine that (i) searches webpages for data that is semantically tagged in accordance with the selected semantic ontology and (ii) indexes the semantically tagged data in the data store;
    using the identified second portion of the set of text elements of the search query to identify contextual information associated with the requested output type of semantic object;
    using the identified contextual information to retrieve knowledge-graph data from a knowledge graph associated with the user;
    filtering the identified plurality of semantic objects of the requested output type based on the retrieved knowledge-graph data;
    transmitting the filtered plurality of semantic objects to the requesting computing device;
    presenting the filtered plurality of semantic objects to the user as results of the search query; and
    receiving a user selection of a presented result of the search query, the presented result being associated with an online application form that is encoded with the selected semantic ontology for the search query, and responsively entering data from the knowledge graph associated with the user into the associated online application form in accordance with the selected semantic ontology of the search query.

2. The method of claim 1, wherein matching the identified first portion of the set of text elements of the search query to the set of semantic objects in the selected semantic ontology includes querying the selected semantic ontology for a semantic object that corresponds to a text element in the identified first portion of the set of text elements.

3. The method of claim 1, wherein the identified contextual information indicates a geographic restriction for semantic objects of the requested output type.

4. The method of claim 1, wherein the identified contextual information indicates a relationship restriction for semantic objects of the requested output type.

5. The method of claim 1, wherein the identified first and second portions of the set of text elements include at least one overlapping text element.

6. The method of claim 1, wherein transmitting the filtered plurality of semantic objects to the requesting computing device includes:
    transmitting, to the requesting computing device, a uniform resource identifier corresponding to at least one semantic object of the plurality of semantic objects that remains after the filtering.

7. The method of claim 1, wherein the data store having been populated with semantic objects of the requested output type comprises the data store having been populated with semantic objects of the requested output type in response to receiving the search query.

8. The method of claim 1, wherein the data store having been populated with semantic objects of the requested output type comprises the data store having been populated with semantic objects of the requested output type periodically according to a predetermined schedule.

9. The method of claim 1, wherein the matching of the identified first portion of the set of text elements gf the search query to the set of semantic objects in the selected semantic ontology is based on a confidence level.

10. The method of claim 1, wherein the identified contextual information associated with the requested output type of semantic object is based on tagged parts-of-speech that modify a subject of the search query, the subject of the search query corresponding to the identified first portion of the set of text elements, the subject of the search query being a semantic object of the requested output type.

11. A non-transitory computer-readable medium comprising instructions that, when executed by at least one processor, cause the at least one processor to perform operations comprising:
    receiving, from a requesting computing device, a search query associated with a user, the search query including a set of text elements;
    using natural language processing to parse the search query to identify first and second portions of the set of text elements;
    using the identified first portion of the set of text elements of the search query to select a semantic ontology for the search query from among a plurality of semantic ontologies by matching the identified first portion of the set of text elements of the search query to a set of semantic objects in the selected semantic ontology, each semantic ontology in the plurality of semantic ontologies defining types of, properties of, and interrelationships between semantic objects in the respective semantic ontology;

determining a requested output type of semantic object being requested by the search query based at least in part on the matching of the identified first portion of the set of text elements of the search query to the set of semantic objects in the selected semantic ontology;

using the determined requested output type of semantic object to identify, in a data store, a plurality of semantic objects of the requested output type,
the data store being formatted in accordance with the selected semantic ontology,
the data store having been populated with semantic objects of the requested output type,
the semantic objects of the requested output type having been identified by a semantic search engine that (i) searches webpages for data that is semantically tagged in accordance with the selected semantic ontology and (ii) indexes the semantically tagged data in the data store;

using the identified second portion of the set of text elements of the search query to identify contextual information associated with the requested output type of semantic object;

using the identified contextual information to retrieve knowledge-graph data from a knowledge graph associated with the user;

filtering the identified plurality of semantic objects of the requested output type based on the retrieved knowledge-graph data; and transmitting the filtered plurality of semantic objects to the requesting computing device;

presenting the filtered plurality of semantic objects to the user as results of the search query; and receiving a user selection of a presented result of the search query, the presented result being associated with an online application form that is encoded with the selected semantic ontology for the search query, and responsively entering data from the knowledge graph associated with the user into the associated online application form in accordance with the selected semantic ontology of the search query.

12. The computer-readable medium of claim 11, wherein transmitting the filtered plurality of semantic objects to the requesting computing device includes:
transmitting, to the requesting computing device, a uniform resource identifier corresponding to at least one semantic object of the plurality of semantic objects that remains after the filtering.

13. A system comprising:
at least one processor; and
a storage device comprising instructions, which when executed by the at least one processor, cause the at least one processor to perform operations comprising:
receiving, from a requesting computing device, a search query associated with a user, the search query including a set of text elements;
using natural language processing to parse the search query to identify first and second portions of the set of text elements;

using the identified first portion of the set of text elements of the search query to select a semantic ontology for the search query from among a plurality of semantic ontologies by matching the identified first portion of the set of text elements of the search query to a set of semantic objects in the selected semantic ontology, each semantic ontology in the plurality of semantic ontologies defining types of, properties of, and interrelationships between semantic objects in the respective semantic ontology;

determining a requested output type of semantic object being requested by the search query based at least in part on the matching of the identified first portion of the set of text elements of the search query to the set of semantic objects in the selected semantic ontology;

using the determined requested output type of semantic object to identify, in a data store, a plurality of semantic objects of the requested output type,
the data store being formatted in accordance with the selected semantic ontology,
the data store having been populated with semantic objects of the requested output type,
the semantic objects of the requested output type having been identified by a semantic search engine that (i) searches webpages for data that is semantically tagged in accordance with the selected semantic ontology and (ii) indexes the semantically tagged data in the data store;

using the identified second portion of the set of text elements of the search query to identify contextual information associated with the requested output type of semantic object;

using the identified contextual information to retrieve knowledge-graph data from a knowledge graph associated with the user;

filtering the identified plurality of semantic objects of the requested output type based on the retrieved knowledge-graph data; and transmitting the filtered plurality of semantic objects to the requesting computing device;

presenting the filtered plurality of semantic objects to the user as results of the search query; and receiving a user selection of a presented result of the search query, the presented result being associated with an online application form that is encoded with the selected semantic ontology for the search query, and responsively entering data from the knowledge graph associated with the user into the associated online application form in accordance with the selected semantic ontology of the search query.

14. The system of claim 13, wherein transmitting the filtered plurality of semantic objects to the requesting computing device includes:
transmitting, to the requesting computing device, a uniform resource identifier corresponding to at least one semantic object of the plurality of semantic objects that remains after the filtering.

* * * * *

UNITED STATES PATENT AND TRADEMARK OFFICE
CERTIFICATE OF CORRECTION

PATENT NO. : 11,238,115 B1
APPLICATION NO. : 15/645582
DATED : February 1, 2022
INVENTOR(S) : David Newman It is certified that error appears in the above-identified patent and that said Letters Patent is hereby corrected as shown below:

In the Claims

In Column 12, Line 42, in Claim 9, delete "gf" and insert --of-- therefor

Signed and Sealed this
Nineteenth Day of April, 2022

Katherine Kelly Vidal
*Director of the United States Patent and Trademark Office*